United States Patent [19]

Graham

[11] 4,260,348
[45] Apr. 7, 1981

[54] SPRUE BUSHING FOR INJECTION MOLDING MACHINE

[76] Inventor: Theodore D. Graham, 5719 NE. 16th Ter., Coral Ridge Isles, Ft. Lauderdale, Fla. 33334

[21] Appl. No.: 84,313

[22] Filed: Oct. 12, 1979

Related U.S. Application Data

[63] Continuation-in-part of Ser. No. 965,054, Nov. 30, 1978, abandoned.

[51] Int. Cl.³ ............................................. B29G 3/00
[52] U.S. Cl. ................................... 425/144; 425/543; 425/548; 425/549; 425/567; 425/569
[58] Field of Search ............... 425/144, 543, 548, 549, 425/547, 567, 569

[56] References Cited

U.S. PATENT DOCUMENTS

| | | | |
|---|---|---|---|
| 2,286,501 | 6/1942 | Narten | 425/549 X |
| 2,309,943 | 2/1943 | Ernst | 425/144 |
| 3,591,897 | 7/1971 | Perras | 425/547 X |
| 3,661,487 | 5/1972 | Susin | 425/543 |
| 3,797,984 | 3/1974 | Yago | 425/543 |
| 3,819,312 | 6/1974 | Arpajian | 425/543 |
| 4,120,086 | 10/1978 | Crandell | 425/144 X |

*Primary Examiner*—Thomas P. Pavelko
*Attorney, Agent, or Firm*—Joseph Zallen

[57] ABSTRACT

A sprue bushing for an injection molding machine comprising a body surrounding a core. The core has a central passageway for flow of the plastic from the nozzle of the machine to the mold and has on its exterior surface longitudinal grooves. Assembly of the body and core forms fluid channels with the grooves. The temperature of the bushing is controlled by the flow of water through the channels.

5 Claims, 4 Drawing Figures

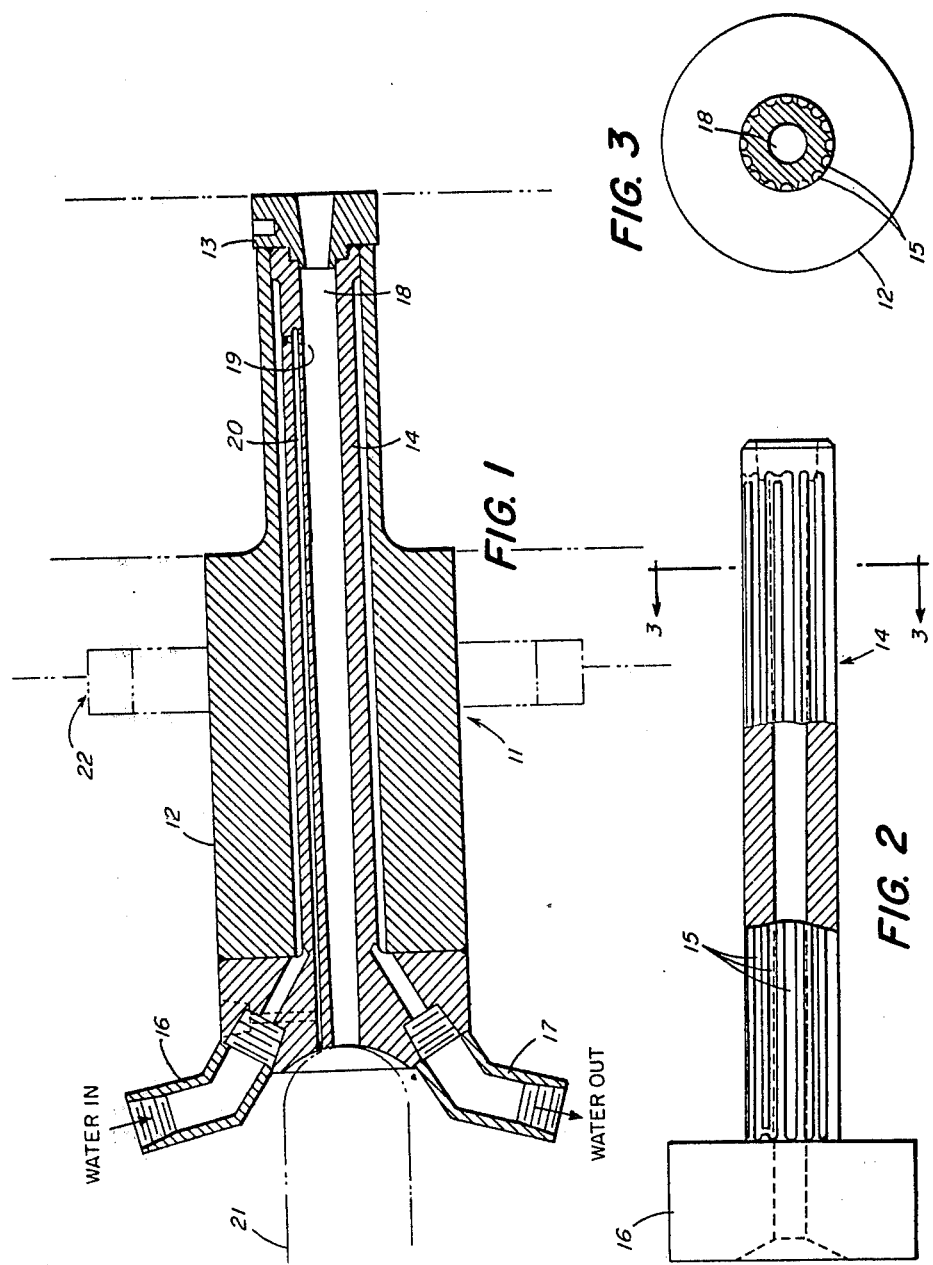

SPRUE BUSHING FOR INJECTION MOLDING MACHINE

BACKGROUND OF INVENTION

This patent application is a continuation-in-part of co-pending application, Ser. No. 965,054 filed Nov. 30, 1978, now abandoned.

This invention relates to the injection molding of thermosetting materials. In particular it relates to the elimination of sprue.

The prior art in injection molding of thermosetting compound typically uses a bushing to convey the material from the injection molding machine to the cavities of the mold. This results in waste material known variously as sprue and cull. The amounts of sprue can be significant since a sprue length can be from three to eight inches. Not only does this constitute waste which must be removed, but it also means that the ram pressure must be higher or the material temperature higher.

Examples of prior art relating generally to sprue bushings in injection molding machines are found in Class 425, sub-classes 543, 547 and 549 including for example, U.S. Pat. Nos. 3,591,897, 3,661,487, 3,797,984, 3,819,312 and 4,120,086.

In U.S. Pat. No. 3,591,897 curing is prevented for the sprue to assure non-curing conditions for injected plastic that is yet to reach the cavity region and the mold has thermo-dynamically isolated regions. It utilizes a conventional sprue bushing.

U.S. Pat. No. 3,661,487 has no sprue bushings and is different from conventional injection molding machines and molds.

U.S. Pat. No. 3,797,984 provides a cold sprue device for use with liquid resins but is not suitable for the use of powdered or pelletized molding powders.

U.S. Pat. No. 3,819,312 isolates a conventional sprue bushing with air but is concerned primarily with the problem of insulating the sprue from the heat curing step.

U.S. Pat. No. 4,120,086 relates to a thermocouple for controlling temperature in a thermoplastic machine by the addition of heat and is not applicable to injection molding of thermosetting plastics.

One object of the present invention is to provide a bushing which can be substituted for the standard bushing in injection molding machines and substantially eliminates any sprue.

Further objects and advantages of the present invention will be apparent from the description and claims which follow taken together with the appended drawings.

SUMMARY OF INVENTION

The invention comprises broadly a sprue bushing for an injection molding machine comprising a body surrounding a core having a central passageway for the molten plastic to flow from the nozzle of the machine to the mold. The body preferably has a smooth inlet bore in which the core is spaced. The outlet surface of the core has longitudinal grooves which in conjunction with the inlet bore of the body form fluid channels. Conduit means are provided through the body and core so as to permit the inlet and outlet of fluid such as water into the channels. In its preferred form, the core has a longitudinal bore in its wall with a vertical bore extending into the central passageway of the core. In this bore can be housed a sensor which would enable control of temperature by controlling the water or other fluid passing through the channels.

The bushing preferably has a removable tip and has a body portion which is slightly smaller in diameter than the diameter of the tip so that when it is inserted into the mold there is an air pocket between the body of the sprue bushing and the mold base.

BRIEF DESCRIPTION OF DRAWINGS

FIG. 1 is a longitudinal section of a bushing made in accordance with this invention.

FIG. 2 is a view of the core of this bushing.

FIG. 3 is an end view of FIG. 2.

SPECIFIC EXAMPLE OF INVENTION

Figure 4:
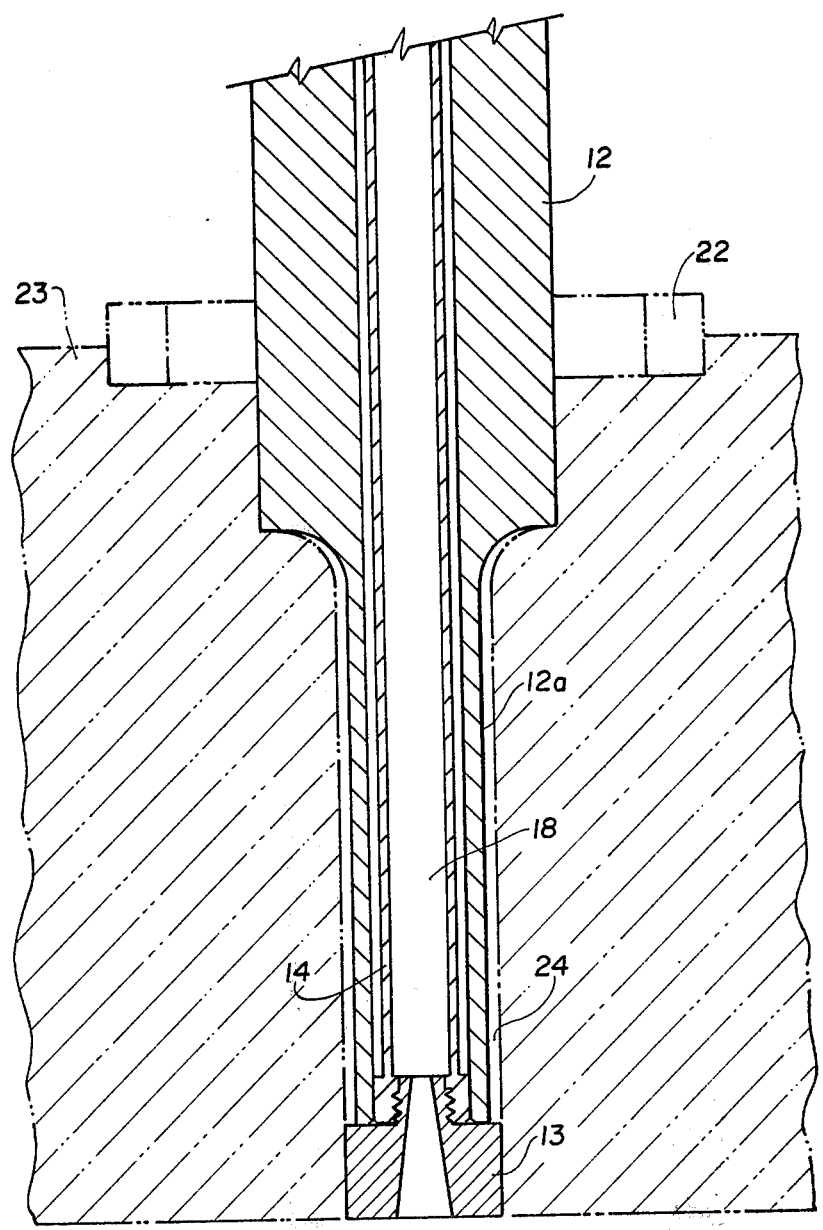
FIG. 4 is a partially enlarged longitudinal section of the bushing in FIG. 1 in a mold base.

Referring now to the drawings, the sprue bushing 11 comprises a body 12, a removable sprue bushing tip 13 and the sprue bushing core 14. The core 14 has a central passageway 18 for the molten plastic which enters from the nozzle 21 shown in phantom. The exterior portion of the core comprises interconnected longitudinal grooves 15 which when assembled with body 12 form channels cooperable with inlet water supply 16 and outlet water supply 17.

Within the core body 14 there is also provided a thin hidden channel 20 having a small opening 19 connected to the passageway 18 near its mouth. Channel 20 and opening 19 permit the insertion of a heat detector as for example a fiber optic ruby which feeds back information to a control system so as to control the temperature in a desired range as for example 150° to 190° F.

The alternating longitudinal grooves 15 are formed by milling. The channels are formed by welding the core 14 to the body 12 and press-fitting the outer shell 22 designates the mold locking ring shown in phantom.

The removable sprue bushing tip 13 has a slightly wider diameter than the elongated body portion 12a, thus forming an air pocket 24 between the body portion 12a and the mold body 23.

The sprue bushing 11 made in accordance with this description was inserted into a multi-cavity mold and into the nozzle of a Hull injection molding machine for thermosetting plastics. A glass-fill phenolic thermosetting molding powder, namely Durez 4-005, having a softening point in the range of 230° to 250° F. was fed into the assembly of molding machine, sprue bushing and mold. Water pressure in the water supply connections 16 and 17 was adjusted to have a flow at a rate of forty pounds per square inch providing a temperature of 170° F. The results of molding with this assembly were compared with the conventional arrangement using the same machine and mold but with a conventional sprue bushing. It was found that with the present invention there was a saving of cycle time of ten seconds and of material of one-half an ounce so as to give a total savings per shot in this particular instance of nine cents. This calculates to be a savings in time and material for a single injection molding machine in normal use of the order of $25,000.00 a year.

I claim:

1. A sprue bushing for use in place of the standard sprue bushing in injection molding machines utilizing thermo-setting plastic molding powders; said bushing comprising an elongated body (12) surrounding a core (14); said body (12) having a smooth inlet bore; said core having a central longitudinal passageway for molten plastic and having longitudinal grooves on its exterior surface; said grooves and inlet bore forming channels for passage of temperature-controlling liquid; means being provided to permit the flow of such liquid into and out of said channels; the diameter of the terminal portion of said bushing being slightly narrower than the mold cavity into which it is inserted so as to form an air gap between the bushing and the mold; a removable tip member being provided at the end of the bushing to form a sealed annular air pocket between the mold and the bushing.

2. Claim 1 wherein the body (12) of the sprue bushing comprises an enlarged inlet portion cooperative with a mold locking ring 22 and a narrower outlet portion; the mold 23 having a bore adapted to seat the enlarged portion and locking ring.

3. The sprue bushing of claim 1 wherein sensor means are provided to monitor the temperature of molten plastic flowing through said central passageway.

4. The sprue bushing of claim 1 wherein a first diagonal channel extends from first water connection means through said body to one side of said longitudinal channels and a second diagonal channel extends from second water connection means through said body to the other side of said longitudinal channels.

5. The sprue bushing of claim 3 wherein a longitudinal interior channel is provided in said core and has a vertical opening into said central passageway; said sensor means being spaced within said interior channel and opening.

* * * * *